(12) United States Patent
Sutton et al.

(10) Patent No.: US 11,315,168 B2
(45) Date of Patent: *Apr. 26, 2022

(54) SYSTEMS AND METHODS FOR PROVIDING AN E-COMMERCE SLIP CART

(71) Applicant: Transform SR Brands LLC, Hoffman Estates, IL (US)

(72) Inventors: Andrea Sutton, Kildeer, IL (US); Robert Hudson, Naperville, IL (US)

(73) Assignee: Transform SR Brands LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,744

(22) Filed: Oct. 7, 2019

(65) Prior Publication Data

US 2020/0111150 A1     Apr. 9, 2020

Related U.S. Application Data

(63) Continuation of application No. 13/910,216, filed on Jun. 5, 2013, now Pat. No. 10,438,272.

(51) Int. Cl.
*G06Q 30/06* (2012.01)
*H04L 67/50* (2022.01)
(Continued)

(52) U.S. Cl.
CPC ..... *G06Q 30/0633* (2013.01); *G06Q 30/0631* (2013.01); *G06Q 50/01* (2013.01);
(Continued)

(58) Field of Classification Search
CPC ............ G06Q 30/0633; G06Q 30/0631; H04L 51/32; H04L 67/22; H04L 67/26; H04L 69/24
(Continued)

(56) References Cited

U.S. PATENT DOCUMENTS 7,792,706 B2    9/2010  Tirumalareddy
2004/0254844 A1   12/2004  Torres
(Continued)

OTHER PUBLICATIONS

Li-Ron, Yael, IE5 Aims to Display Web Pages Your Way, Sep. 1, 1998, PC World, 16.9:66, p. 1. (Year: 1998).*
(Continued)

*Primary Examiner* — Jason B Dunham
*Assistant Examiner* — Brittany E Bargeon
(74) *Attorney, Agent, or Firm* — McAndrews, Held & Malloy, Ltd.

(57) ABSTRACT

A method for managing an electronic commerce (e-commerce) shopping cart may include, in a computing device comprising a touch screen, memory, and at least one processor, receiving a selection of one of a plurality of web pages associated with an e-commerce web site. The selected one of the plurality of web pages and an indication of the e-commerce shopping cart may be displayed on the touch screen. The indication of the e-commerce shopping cart may be integrated for display into each of the plurality of web pages. While displaying the selected one of the plurality of web pages and the indication of the e-commerce shopping cart, at least one gesture event associated with the e-commerce shopping cart may be detected. Access to the e-commerce shopping cart may be enabled upon detecting the at least one gesture event.

16 Claims, 5 Drawing Sheets

(51) Int. Cl.
    *H04L 51/52*     (2022.01)
    *H04L 67/55*     (2022.01)
    *H04L 69/24*     (2022.01)
    *G06Q 50/00*     (2012.01)

(52) U.S. Cl.
    CPC .............. *H04L 51/32* (2013.01); *H04L 67/22* (2013.01); *H04L 67/26* (2013.01); *H04L 69/24* (2013.01)

(58) Field of Classification Search
    USPC ....................................................... 705/26.8
    See application file for complete search history.

(56) References Cited

U.S. PATENT DOCUMENTS

| | | |
|---|---|---|
| 2006/0173985 A1 | 8/2006 | Moore |
| 2007/0078727 A1 | 4/2007 | Spiegel |
| 2009/0006181 A1 | 1/2009 | Ghosh |
| 2009/0043674 A1* | 2/2009 | Minsky .............. G06Q 30/0633 705/26.8 |
| 2010/0217685 A1 | 8/2010 | Melcher |
| 2011/0047491 A1 | 2/2011 | Hwang |
| 2011/0251928 A1 | 10/2011 | Van Buskirk |
| 2011/0271181 A1* | 11/2011 | Tsai ........................ G06F 21/83 715/702 |
| 2012/0123865 A1* | 5/2012 | Salzano ............. G06Q 30/0257 705/14.55 |
| 2012/0150666 A1* | 6/2012 | Savic .................... G06Q 90/205 705/14.73 |
| 2012/0215656 A1* | 8/2012 | Chen ..................... G06Q 30/06 705/26.8 |
| 2014/0180880 A1 | 6/2014 | Godsey |
| 2014/0244441 A1* | 8/2014 | Maenpaa ........... G06Q 30/0613 705/26.62 |
| 2014/0304646 A1 | 10/2014 | Rossmann |

OTHER PUBLICATIONS

Canadian Intellectual Property Office, Requisition by Examiner, Application No. 2,853,539, dated Dec. 15, 2015 (5 pages).
Canadian Intellectual Property Office, Requisition by Examiner, Application No. 2,853,539, dated Oct. 13, 2016 (5 pages).
I-Ron, Yael, IE5 Aims to Display Web Pages Your Way, Sep. 1, 1998, PC World, 16.9:66, p. 1 (1998) (4 pages).

* cited by examiner

SYSTEMS AND METHODS FOR PROVIDING AN E-COMMERCE SLIP CART

CROSS-REFERENCE TO RELATED APPLICATIONS

The present application is a continuation of U.S. application Ser. No. 13/910,216, filed Jun. 5, 2013. The present application also makes reference to U.S. application Ser. No. 13/886,065, filed on May 2, 2013. The above-identified applications are hereby incorporated by reference herein in their entirety.

FIELD OF THE DISCLOSURE

The subject disclosure relates generally to retail systems and, more particularly, relates to systems and methods for providing an electronic commerce (e-commerce) slip cart.

BACKGROUND

As the Internet is becoming more commercially oriented, many product and service providers utilize one or more on-line e-commerce web sites for offering their products and services for sale. However, the e-commerce participants and potential purchasers of such products and services are greatly limited by the flexibility and capabilities of the e-commerce web sites.

Further limitations and disadvantages of conventional and traditional approaches will become apparent to one of skill in the art, through comparison of such approaches with some aspects of the present method and apparatus set forth in the remainder of this disclosure with reference to the drawings.

SUMMARY

A system and/or method is disclosed for providing an e-commerce slip cart, substantially as shown in and/or described in connection with at least one of the figures, as set forth more completely in the claims.

These and other advantages, aspects and features of the present disclosure, as well as details of illustrated implementation(s) thereof, will be more fully understood from the following description and drawings.

DETAILED DESCRIPTION

Figure 1:
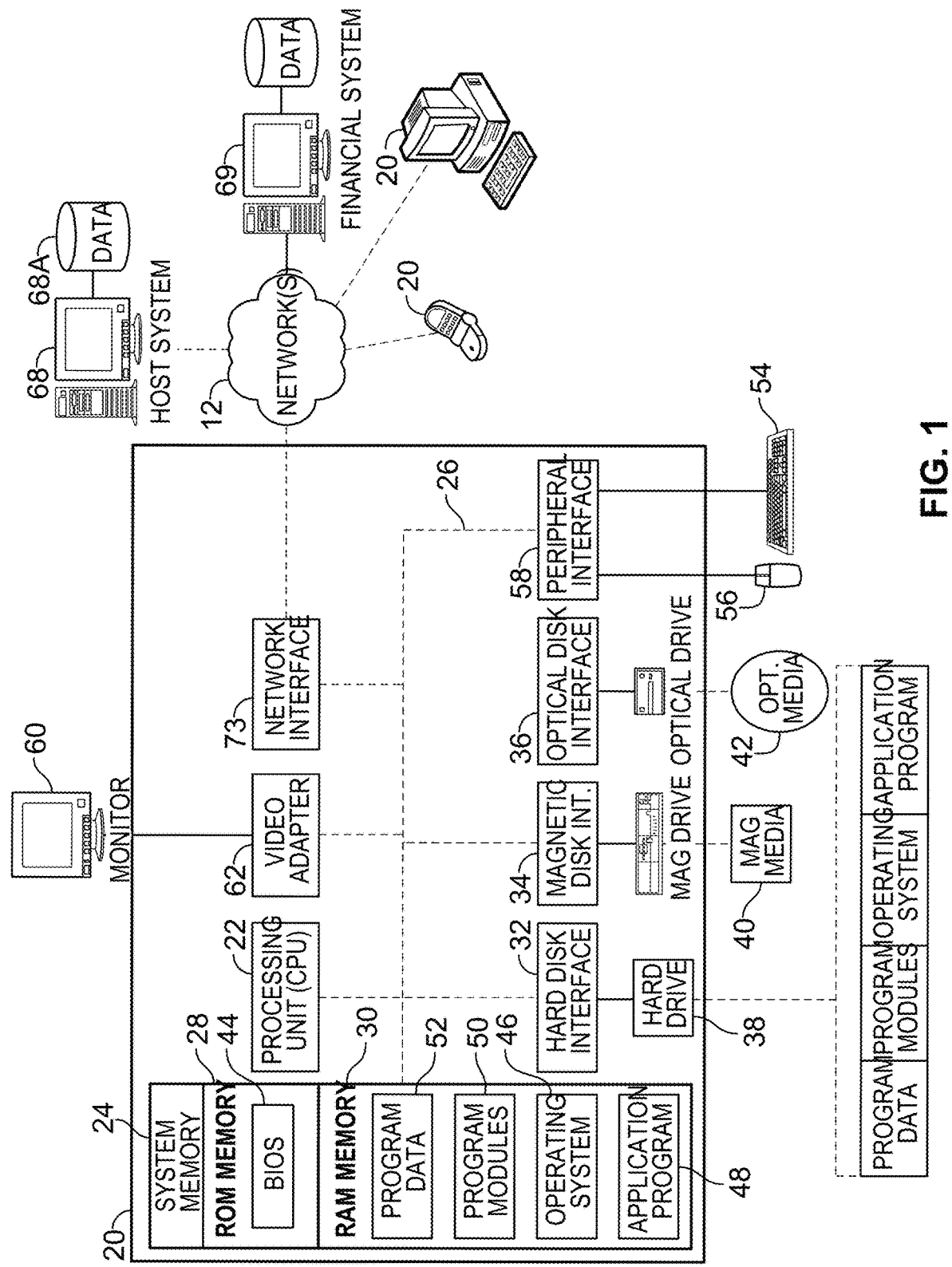
FIG. 1 is a block diagram illustrating example retail, computer network environment for providing an e-commerce slip cart, in accordance with an example embodiment of the disclosure.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "e.g.," introduces a list of one or more non-limiting examples, instances, or illustrations. As utilized herein, the term "processor" may be used to refer to one or more of a central processing unit, a processor of a symmetric or asymmetric multiprocessor system, a digital signal processor, a micro-controller, a graphics/video processor, or another type of processor.

The present disclosure relates to systems and methods for providing an e-commerce slip cart. As used herein, the term "slip cart" (or "persistent cart" or "ever-present cart") means an electronic commerce (e-commerce) shopping cart, which is integrated within and slides into place on every web page that is part of a merchant's e-commerce web site, during a user's browsing session. For example, such "slip cart" will slide into place (e.g., at the upper right corner of the screen) and be part of every browsing page associated with the merchant's web site, including search result pages and product details pages. In this regard, the "slip cart" may comprise a separate work space on the e-commerce web site, where access to the "slip cart" may be enabled using, for example, a gesture (e.g., a sliding gesture, a tapping gesture or another type of gesture using touch-screen capabilities of a user device) and/or another user command triggered via an input/output system of the user device (e.g., a voice command, a mouse click, etc.).

Additionally, the "slip cart" may be implemented to use drag-and-drop functionality, enabling a user to slide any product (or service) appearing on the merchant's web site and drop it inside the "slip cart", with instant visualization of quantity, item description, total cost of all items in the cart, item categories, etc.

Furthermore, a user may save a currently active "slip cart", creating a saved cart (or a saved items list or a saved items catalog), which may be shared within the user's social network (or within other networks or social platforms, e.g., within a merchant's object driven newsfeed). When opened (e.g., a cart detailed view is activated), the "slip cart" may provide details on the items contents, checkout, payment and shipment selection capabilities (per item, per group of items, or collectively for all items in the cart). The "slip cart" may also list special merchant promotions (e.g., coupons or other types of discounts) that are available for activation by the user, based on the contents of the "slip cart". Additional information provided by the detailed view of the "slip cart" may also include a list of other saved carts (or "cart boards") associated with the user, item recommendations provided based on the items in the cart, as well as sharing, payment, shipment options for any item, group of items or entire saved carts associated with the user profile and appearing within the detailed view of the "slip cart".

In this regard, by using a "slip cart" with the above functionalities, an e-commerce web site may allow a user to "work" on their order while browsing/shopping on the merchant's web site. More specifically, by using the above described functionalities of the "slip cart", a user may, for example, drag and drop items into the cart, as well as to ship them, share them, or save the cart (and then share it via a social network) fluidly. The saved carts (or "cart boards") may be, for example, categorized based on the items within them, and may appear in item (or category) searches performed within social networks or within the merchant's e-commerce web site, thereby increasing item visibility, network traffic and e-commerce sales.

FIG. 1 is a block diagram illustrating example retail, computer network environment for providing an e-commerce slip cart, in accordance with an example embodiment of the disclosure. Referring to FIG. 1, the retail, computer network environment 100 may comprise a processing device 20 and a vendor system server (or a host) 68, which may be associated with a retailer. The processing device 20 may comprise a computing device such as a smart phone, a mobile phone, a tablet and/or other mobile or computing devices. The host 68 may comprise suitable circuitry, logic and/or code and may be implemented as one or more network servers, which may be operable to implement an online retail channel of a retailer (e.g., one or more online stores of the retailer, where customers may shop for items and/or services sold by the retailer using one or more web sites of the retailer, where the web site may use "slip cart" functionalities as described herein).

Those of ordinary skill in the art will appreciate that the processing device 20 illustrated in FIG. 1 may be embodied in any device having the ability to execute instructions, such as, by way of example, a personal computer, mainframe computer, personal-digital assistant ("FDA"), cellular telephone, or the like. Furthermore, while described and illustrated in the context of a single processing device 20, those of ordinary skill in the art will also appreciate that the various tasks described hereinafter may be practiced in a distributed environment having multiple processing devices linked via a wired and/or wireless local (LAN) or wide-area network (WAN), whereby the executable instructions may be associated with and/or executed by one or more of multiple processing devices.

For performing the various tasks in accordance with the executable instructions, the processing device 20 may include a processing unit 22 and a system memory 24, which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30.

Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those of ordinary skill in the art will further appreciate that other types of non-transitory computer readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories and memory devices.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more application programs 48 (such as a Web browser), other program modules 50, and/or program data 52. Still further, computer-executable instructions may be downloaded to one or more of the computing devices as needed, for example via a network connection. Generally, the computer executable instructions may reside in program modules, which may include routines, programs, objects, components, data structures, etc. that perform particular tasks or implement particular abstract data types.

To allow a user to enter commands and information into the processing device 20, input devices such as a keyboard 54 and/or a pointing device 56 may be provided. While not illustrated, other input devices may include a microphone, a joystick, a game pad, a scanner, a camera, etc. These and other input devices may be connected to the processing unit 22 by means of an interface 58 which, in turn, may be coupled to the bus 26. Input devices may be connected to the processor 22 using interfaces such as, for example, a parallel port, game port, FireWire, or a universal serial bus (USB). To view information from the processing device 20, a monitor 60 (e.g., a touch screen monitor) or other type of display device may also be connected to the bus 26 via an interface, such as a video adapter 62. In addition to the monitor 60, the processing device 20 may also include other peripheral output devices, not shown, such as speakers and/or printers.

The processing device 20, illustrated in the exemplary form of a computer system, is provided with executable instructions to, for example, manage an e-commerce shopping cart (e.g., "slip cart"). The executable instructions may provide a means (e.g., one or more user interfaces in a web page) for a consumer, e.g., a user, customer, etc., to access the vendor system server 68 and, among other things, to browse through an online catalog of items available for sale in the online retail channel of the retailer (online store), and order one or more of such items by placing them (e.g., using drag-and-drop functionality) in an online e-commerce "slip cart" available for use at each page of the online store.

The processing device 20 may receive a selection of one of a plurality of web pages associated with an e-commerce web site (online store) of a merchant (e.g., a vendor, managing the vendor system server 68). The selected one of the plurality of web pages and an indication of the e-commerce shopping cart may be displayed on the touch screen (e.g., monitor 60). The indication of the e-commerce shopping cart may be integrated for display into each of the plurality of web pages of the online store. While displaying the selected one of the plurality of web pages and the indication of the e-commerce shopping cart, at least one gesture event associated with the e-commerce shopping cart may be detected (e.g., a swiping gesture). Upon detecting the at least one gesture event, access to the e-commerce shopping cart may be enabled, allowing the user to edit the cart, check-out, ship items, use one or more promotions displayed within the "slip cart" based on the cart contents, save the cart as a "cart board", share the currently saved "cart board" or a previously saved "cart board", edit or ship items from other previously saved "cart boards", share one or more saved "cart boards" via a social network or another social platform (e.g., an object driven newsfeed of the merchant), and other "slip cart" functionalities disclosed herein. Additional information about object driven newsfeeds may be found in U.S. application Ser. No. 13/886,065, filed on May 2, 2013, entitled "OBJECT DRIVEN NEWSFEED," which is incorporated herein by reference in its entirety.

As noted, the processing device 20 may also utilize logical connections to one or more remote processing devices, such as the vendor system server 68 having associated data repository 68A. In this regard, while the vendor system server 68 has been illustrated in the exemplary form of a computer, it will be appreciated that the vendor system server 68 may, like processing device 20, be any type of a computing device having processing capabilities. Again, it will be appreciated that the vendor system server 68 need not be implemented as a single device but may be implemented in a manner, such that the tasks performed by the vendor system server 68 are distributed amongst a plurality of processing devices/databases located at different geographical locations and linked through a wired and/or wireless communication network. Additionally, the vendor system server 68 may have logical connections to other third party systems (e.g., 69) via the network 12 and, via such connections, will be associated with data repositories that are associated with such other third party systems. Such third party systems 69 may include, without limitation, systems of banking, credit, or other financial institutions, systems of third party providers of goods and/or services, systems of shipping/delivery companies, etc.

For performing tasks as needed, the vendor system server 68 may include many or all of the elements described above relative to the processing device 20 and the "slip cart" implementation and functionalities. In addition, the vendor system server 68 may include executable instructions for, among other things, manage an e-commerce shopping cart (e.g., "slip cart"). The executable instructions may provide a means (e.g., one or more user interfaces in a web page) for a consumer, e.g., a user, customer, etc., to access (e.g., via processing device 20) the vendor system server 68 and, among other things, to browse through an online catalog of items available for sale in the online retail channel of the retailer (online store), and order one or more of such items by placing them (e.g., using drag-and-drop functionality) in an online e-commerce "slip cart" available for use at each page of the online store.

Communications between the processing device 20 and the vendor system server 68 may be exchanged via a further processing device, such as a network router 72, which may be responsible for network routing. Communications with the network router 72 may be performed via a network interface component 73. Thus, within such a networked environment, e.g., the Internet, World Wide Web, LAN, or other similar type of wired and/or wireless network, it will be appreciated that program modules depicted relative to the processing device 20, or portions thereof, may be stored in the non-transitory memory storage device(s) of the vendor system server 68.

Figure 2:
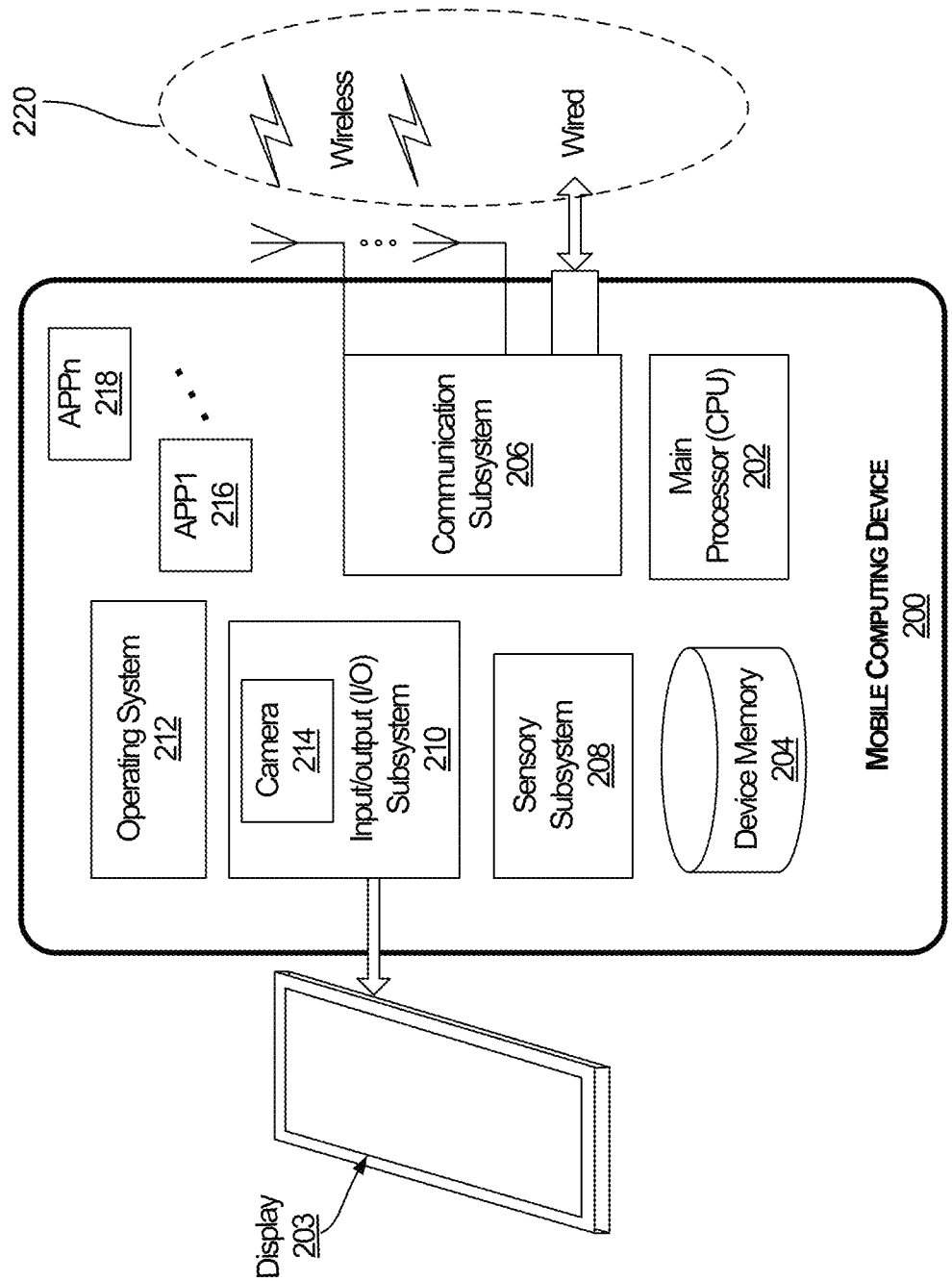
FIG. 2 is a block diagram of an example mobile computing device, which may be used in connection with the retail, computer network environment of FIG. 1, in accordance with an example embodiment of the disclosure.

FIG. 2 is a block diagram of an example mobile computing device, which may be used in connection with the retail, computer network environment of FIG. 1, in accordance with an example embodiment of the disclosure. Referring to FIG. 2, there is illustrated a more detailed diagram of the processing device 20 in instances when it comprises a mobile computing device. More specifically, the computing device 200 may include a handset, a smartphone, a tablet, a laptop, and/or another handheld or portable computing device. The computing device 200 may comprise, for example, a main processor 202, a system memory 204, a communication subsystem 206, a sensory subsystem 208, an input/output (I/O) subsystem 210, and a display 103. The computing device may also comprise an operating system 212 and one or more applications 216, . . . , 218 running on the computing device 200.

The main processor 202 may comprise suitable logic, circuitry, interfaces, and/or code that may be operable to process data, and/or control and/or manage operations of the computing device 200, and/or tasks and/or applications performed therein in connection with the architecture 100 (e.g., tasks associated with the "slip cart" functionalities disclosed herein). In this regard, the main processor 202 may be operable to configure and/or control operations of various components and/or subsystems of the computing device 200, by utilizing, for example, one or more control signals. The main processor 202 enables running and/or execution of applications, programs and/or code, which may be stored, for example, in the system memory 204. Alternatively, one or more dedicated application processors may be utilized for running and/or executing applications (or programs) in the computing device 200.

In some instances, one or more of the applications 216, . . . , 218 running and/or executing on the computing device 200 may generate and/or update video content that may be rendered via the display 203. In some instances, one or more of the applications 216, . . . , 218 may be operable to implement an object driven newsfeed of an e-commerce merchant (and/or an e-commerce web site of the merchant). Additionally, such application(s) may be operable to implement "slip cart" functionalities, as described herein, in connection with the e-commerce web site.

The system memory 204 may comprise suitable logic, circuitry, interfaces, and/or code that may enable permanent and/or non-permanent storage, buffering, and/or fetching of data, code and/or other information, which may be used, consumed, and/or processed. In this regard, the system memory 204 may comprise different memory technologies, including, for example, read-only memory (ROM), random access memory (RAM), Flash memory, solid-state drive (SSD), and/or field-programmable gate array (FPGA). The system memory 204 may store, for example, configuration data, which may comprise parameters and/or code, comprising software and/or firmware (e.g., the operating system 212 and/or the one or more applications 216, . . . , 218).

The communication subsystem 206 may comprise suitable logic, circuitry, interfaces, and/or code operable to communicate data from and/or to the computing device, such as via one or more wired and/or wireless connections 220. The communication subsystem 206 may be configured to support one or more wired protocols (e.g., Ethernet standards, MOCA, etc.) and/or wireless protocols or interfaces (e.g., CDMA, WCDMA, TDMA, GSM, GPRS, UMTS, EDGE, EGPRS, OFDM, TD-SCDMA, HSDPA, LTE, WiMAX, WiFi, Bluetooth, and/or any other available wireless protocol/interface), facilitating transmission and/or reception of signals to and/or from the computing device 200, and/or processing of transmitted or received signals in accordance with applicable wired or wireless protocols. In this regard, signal processing operations may comprise filtering, amplification, analog-to-digital conversion and/or digital-to-analog conversion, up-conversion/down-conversion of baseband signals, encoding/decoding, encryption/decryption, and/or modulation/demodulation. In accordance with an embodiment of the disclosure, the communication subsystem 206 may provide wired and/or wireless connections to, for example, the vendor system server 68 using the wired and/or wireless connections 220.

The sensory subsystem 208 may comprise suitable logic, circuitry, interfaces, and/or code for obtaining and/or generating sensory information, which may relate to the computing device 200, its user(s), and/or its environment. For example, the sensory subsystem 208 may comprise positional or locational sensors (e.g., GPS or other GNSS based sensors), ambient conditions (e.g., temperature, humidity, or light) sensors, and/or motion related sensors (e.g., accelerometer, gyroscope, pedometers, and/or altimeters). In some instances, one or more of the sensors within the sensory subsystem 208 (with or without the use of camera 214) may be used during a gesture, for purposes of indicating desire to transfer content between devices (e.g., to indicate that transfer of content is desired, to indicate a direction where the receiving device is located, to initiate an optical selector/interface for selecting a receiving device, as well as other uses as described herein for facilitating the transfer of content).

The I/O subsystem 210 may comprise suitable logic, circuitry, interfaces, and/or code for enabling user interactions with the computing device 200, enabling obtaining input from user(s) and/or to providing output to the user(s). The I/O subsystem 210 may support various types of inputs and/or outputs, including, for example, video, audio, and/or textual. In this regard, dedicated I/O devices and/or components, external to or integrated within the computing device 200, may be utilized for inputting and/or outputting data during operations of the I/O subsystem 210. Example I/O devices may comprise the camera 214, displays, mice, keyboards, touchscreens, voice input interfaces, and other input/output interfaces or devices. With respect to video outputs, the I/O subsystem 210 may be operable to generate and/or process video content, graphics, and/or textual data, and/or generate video frames based thereon for display, via the display 203 for example.

The display 203 may comprise suitable logic, circuitry, interfaces and/or code that may enable displaying of video content, which may be handled and/or processed via the I/O subsystem 210. The display 203 may include a touch-screen and may be used in outputting video data.

The operating system 212 may include software that is used to manage the various hardware resources of the computing device 200. The operating system 212 may also be used to provide common services to computer programs or applications, such as the one or more applications 216, . . . , 218. The operating system 212 may act as an intermediary between the hardware components and the one or more applications 216, . . . , 218.

The one or more applications 216, . . . , 218 may include one or more software applications (i.e., computer programs) that may help a user of the computing device 200 perform a specific task. For example, a software application may include an interactive application that displays content to a user and allows the user to provide input as to the manner in which the content is provided and/or the type of content that is provided. To perform a task (e.g., web browsing, video playback, etc.), the one or more applications 216, . . . , 218 may access the CPU 202, the memory 204, and/or any other circuit within the computing device 102, as well as the operating system 212. In some instances, one or more of the applications 216, . . . , 218 may be operable to implement an object driven newsfeed of an e-commerce merchant (and/or an e-commerce web site of the merchant). Additionally, such application(s) may be operable to implement "slip cart" functionalities, as described herein, in connection with the e-commerce web site.

Figure 3A:
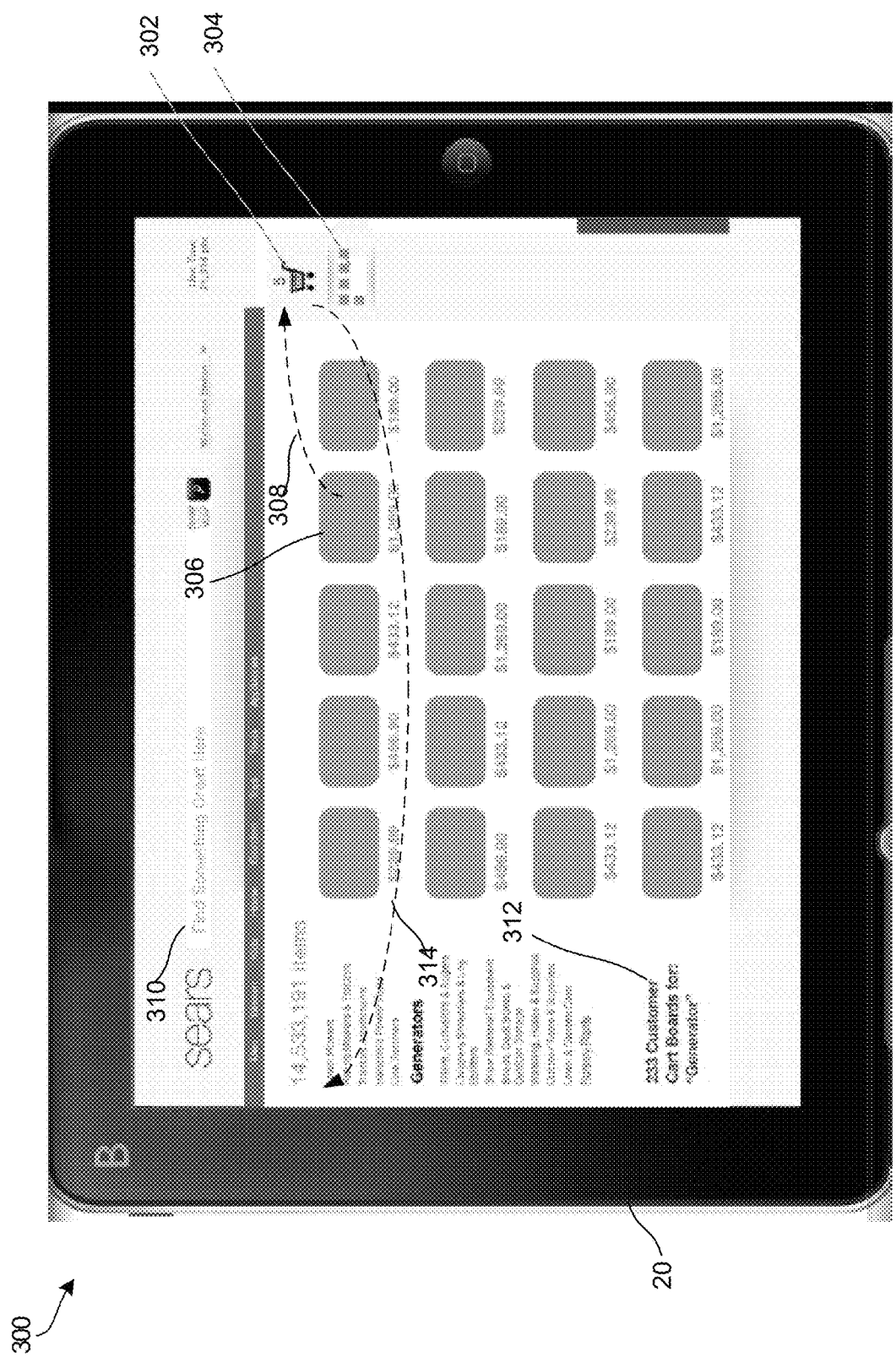
FIG. 3A is a block diagram illustrating a screen shot of graphical user interface of an e-commerce web site using a slip cart, in accordance with an example embodiment of the disclosure.

FIG. 3A is a block diagram illustrating a screen shot of graphical user interface of an e-commerce web site using a slip cart, in accordance with an example embodiment of the disclosure. Referring to FIG. 3A, the screenshot 300 may illustrate a "slip cart" 302, which may be present during e-commerce activity of a user using the computing device 20. For example, a user may browse items available for sale on the e-commerce web site. After deciding to buy item 306, user may use a "drag-and-drop" sliding gesture to slide the item 306 along path 308 and "drop" it inside the "slip cart" 302. The item count indication 304 may indicate the number of items stored in the "slip cart" 302. The "slip cart"

In some instances, other sliding gestures may be used (e.g., a tapping gesture or another type of gesture using touch-screen capabilities of the user device 20) and/or another user command triggered via an input/output system of the user device 20 (e.g., a voice command, a mouse click, etc.).

Figure 3B:
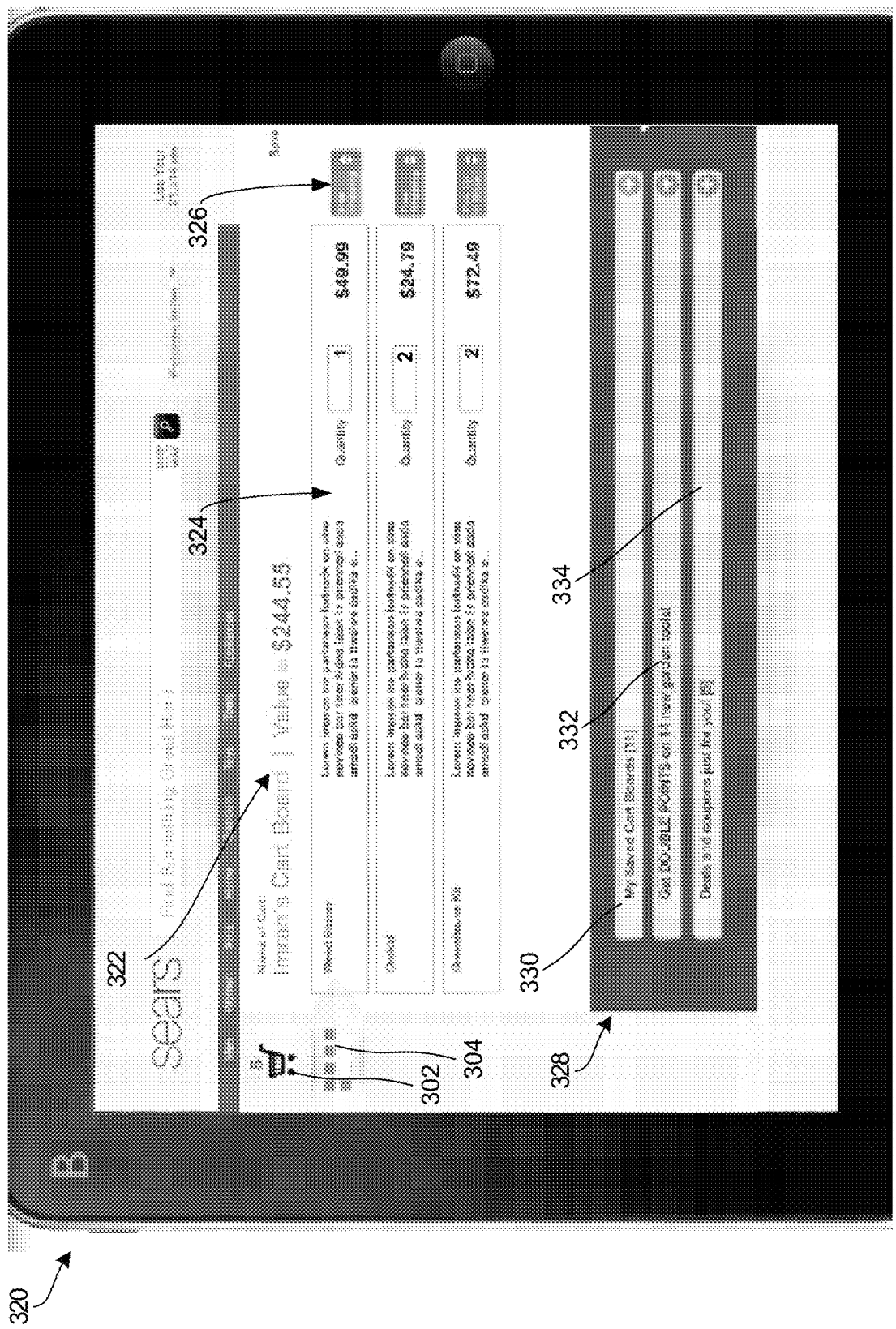
FIG. 3B is a block diagram illustrating another screen shot of a more detailed view of the e-commerce slip cart of FIG. 3A, in accordance with an example embodiment of the disclosure.

In other instances, a user may activate (or open) the "slip cart" 302 by sliding it across the screen along an example sliding path 314, allowing for instant visualization of quantity, item description, total cost of all items in the cart, item categories, etc., as illustrated in FIG. 3B.

FIG. 3B is a block diagram illustrating another screen shot of a more detailed view of the e-commerce slip cart of FIG. 3A, in accordance with an example embodiment of the disclosure. Referring to FIG. 3B, there is illustrated a screenshot 320 of the activated (or opened) "slip cart" 302. More specifically, the screenshot 320 illustrates a detailed description 324. Additional functionality (e.g., buttons 326) may also be provided within the activated (open) "slip cart", which may be used to select one or more of the items inside the cart for payment, shipment, and/or store pickup.

Furthermore, a user may save the currently active "slip cart" 302 (e.g., under the cart name 322), creating a saved cart (or a saved items list or a saved items catalog), which may be shared within the user's social network (or within other networks or social platforms, e.g., within a merchant's object driven newsfeed).

The "slip cart" 302 may also list additional information 328. For example, the additional information 328 may include special merchant promotions (e.g., coupons or other types of discounts 334 and specific item promotions 332) that are available for activation by the user, based on the contents of the "slip cart" 302. Additional information provided by the detailed view of the "slip cart" may also include a list 330 of other saved carts (or "cart boards") associated with the user.

Referring to FIGS. 3A and 3B, once cart boards are saved by user(s) of the merchant web site, the cart boards may be searchable and may appear in search results. For example, if a user performs a search for "generators" in the search field 310, the screenshot 300 provides an indication 312 that saved cart boards related to generators are available for access and review by the user. In this regard, saved cart boards may be used as recommendation lists for other users of the e-commerce web site.

Figure 4:
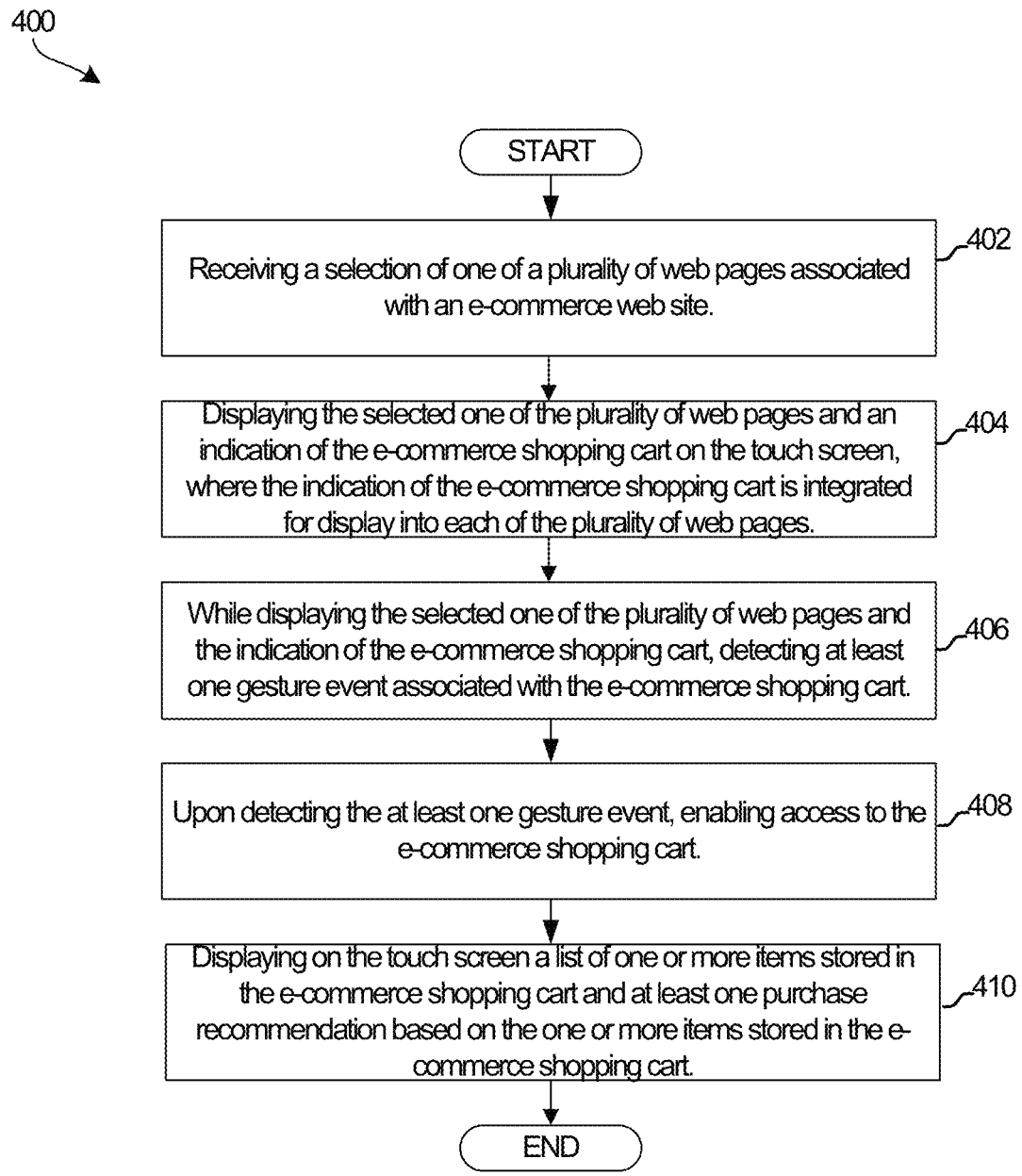
FIG. 4 is a flow chart illustrating example steps of a method for providing an e-commerce slip cart, in accordance with an example embodiment of the disclosure.

FIG. 4 is a flow chart illustrating example steps of a method for providing an e-commerce slip cart, in accordance with an example embodiment of the disclosure. Referring to FIGS. 1-4, the example method for managing an electronic commerce (e-commerce) shopping cart may start at 402 when, in a computing device 20 comprising a touch screen 203, memory 204, and at least one processor 202, a selection of one of a plurality of web pages associated with an e-commerce web site may be received. At 404, the selected one of the plurality of web pages and an indication of the e-commerce shopping cart (e.g., 302) may be displayed on the touch screen 203. The indication of the e-commerce shopping cart may be integrated for display into each of the plurality of web pages. At 406, while displaying the selected one of the plurality of web pages and the indication of the e-commerce shopping cart 302, at least one gesture event associated with the e-commerce shopping cart may be detected. At 408, access to the e-commerce shopping cart 302 may be enabled upon detecting the at least one gesture event. At 410, a list 324 of one or more items stored in the e-commerce shopping cart 302 and at least one purchase recommendation (e.g., 322-324) based on the one or more items stored in the e-commerce shopping cart may be displayed on the touch screen 203.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method for managing an electronic commerce (e-commerce) shopping cart, comprising:
in a computing device comprising a touch screen, memory, and at least one processor:
receiving a selection of one of a plurality of web pages associated with an e-commerce web site;
displaying the selected one of the plurality of web pages and an indication of the e-commerce shopping cart on the touch screen, wherein:
the indication of the e-commerce shopping cart slides to a predetermined location on the touch screen,
the e-commerce shopping cart comprises a work space on the e-commerce web site,
the e-commerce shopping cart is categorized according to one or more items within the e-commerce shopping cart,
the e-commerce shopping cart is searchable by a third party, and
the indication of the e-commerce shopping cart is integrated for display into each of the plurality of web pages;
while displaying the selected one of the plurality of web pages and the indication of the e-commerce shopping cart, detecting at least one gesture event associated with the e-commerce shopping cart;
upon detecting the at least one gesture event, enabling access to the e-commerce shopping cart, wherein the at least one gesture event comprises at least one sliding gesture, wherein the at least one sliding gesture comprises sliding the e-commerce shopping cart across the touch screen in a sliding path; and
upon enabling the access, displaying on the touch screen:
a list of one or more items stored in the e-commerce shopping cart, the one or more items available for sale on the web site; and
at least one purchase recommendation for at least another item available for sale on the web site, the at least one purchase recommendation based on the one or more items stored in the e-commerce shopping cart.

2. The method according to claim 1, comprising:
enabling sharing at least a portion of the e-commerce shopping cart within a social network associated with a user profile.

3. The method according to claim 1, comprising:
upon enabling the access, displaying on the touch screen a list of one or more stored shopping carts associated with a user profile.

4. A method for managing an electronic commerce (e-commerce) shopping cart, comprising:
in a computing device comprising a touch screen, memory, and at least one processor:
receiving a selection of one of a plurality of web pages associated with an e-commerce web site;
displaying the selected one of the plurality of web pages and an indication of the e-commerce shopping cart on the touch screen, wherein:
the indication of the e-commerce shopping cart slides to a predetermined location on the touch screen,
the e-commerce shopping cart comprises a work space on the e-commerce web site,
the e-commerce shopping cart is categorized according to one or more items within the e-commerce shopping cart,
the e-commerce shopping cart is searchable by a third party, and
the indication of the e-commerce shopping cart is integrated for display into each of the plurality of web pages;
while displaying the selected one of the plurality of web pages and the indication of the e-commerce shopping cart, detecting at least one gesture event associated with the e-commerce shopping cart; and
upon detecting the at least one gesture event, enabling access to the e-commerce shopping cart, wherein the at least one gesture event comprises at least one sliding gesture, wherein the at least one sliding gesture comprises sliding the e-commerce shopping cart across the touch screen in a sliding path, wherein the indication of the e-commerce shopping cart comprises an indication of the number of items stored in the e-commerce shopping cart.

5. A method for managing an electronic commerce (e-commerce) shopping cart, comprising:
in a computing device comprising a touch screen, memory, and at least one processor:
receiving a selection of one of a plurality of web pages associated with an e-commerce web site;
displaying the selected one of the plurality of web pages and an indication of the e-commerce shopping cart on the touch screen, wherein:
the indication of the e-commerce shopping cart slides to a predetermined location on the touch screen,
the e-commerce shopping cart comprises a work space on the e-commerce web site,
the e-commerce shopping cart is categorized according to one or more items within the e-commerce shopping cart,
the e-commerce shopping cart is searchable by a third party, and
the indication of the e-commerce shopping cart is integrated for display into each of the plurality of web pages;
while displaying the selected one of the plurality of web pages and the indication of the e-commerce shopping cart, detecting at least one gesture event associated with the e-commerce shopping cart; and
upon detecting the at least one gesture event, enabling access to the e-commerce shopping cart, wherein the at least one gesture event comprises at least one sliding gesture, wherein the at least one sliding gesture comprises sliding the e-commerce shopping cart across the touch screen in a sliding path, wherein the e-commerce shopping cart is associated with a user profile of a user of the e-commerce web site.

6. The method according to claim 5, comprising:
storing the e-commerce shopping cart as a shopping cart associated with the user profile.

7. The method according to claim 6, wherein the stored shopping cart is discoverable via an item search on the e-commerce web site.

8. A method for managing an electronic commerce (e-commerce) shopping cart, comprising:
in a computing device comprising a touch screen, memory, and at least one processor:
receiving a selection of one of a plurality of web pages associated with an e-commerce web site;
displaying the selected one of the plurality of web pages and an indication of the e-commerce shopping cart on the touch screen, wherein:
the indication of the e-commerce shopping cart slides to a predetermined location on the touch screen,
the e-commerce shopping cart comprises a work space on the e-commerce web site,
the e-commerce shopping cart is categorized according to one or more items within the e-commerce shopping cart,
the e-commerce shopping cart is searchable by a third party, and
the indication of the e-commerce shopping cart is integrated for display into each of the plurality of web pages;
while displaying the selected one of the plurality of web pages and the indication of the e-commerce shopping cart, detecting at least one gesture event associated with the e-commerce shopping cart;
upon detecting the at least one gesture event, enabling access to the e-commerce shopping cart, wherein the at least one gesture event comprises at least one sliding gesture, wherein the at least one sliding gesture comprises sliding the e-commerce shopping cart across the touch screen in a sliding path; and
upon detecting at least another gesture event, preventing access to the e-commerce shopping cart and resuming display of the selected one of the plurality of web pages.

9. A non-transitory, machine-readable storage medium, having stored thereon a computer program having at least one code section for managing an electronic commerce (e-commerce) shopping cart, the at least one code section executable by a machine for causing the machine to perform a method comprising:
in a computing device comprising a touch screen, memory, and at least one processor:
receiving a selection of one of a plurality of web pages associated with an e-commerce web site;
displaying the selected one of the plurality of web pages and an indication of the e-commerce shopping cart on the touch screen, wherein:
the indication of the e-commerce shopping cart slides to a predetermined location on the touch screen,
the e-commerce shopping cart comprises a work space on the e-commerce web site,
the e-commerce shopping cart is categorized according to one or more items within the e-commerce shopping cart,
the e-commerce shopping cart is searchable by a third party, and
the indication of the e-commerce shopping cart is integrated for display into each of the plurality of web pages;
while displaying the selected one of the plurality of web pages and the indication of the e-commerce shopping cart, detecting at least one gesture event associated with the e-commerce shopping cart; and
upon detecting the at least one gesture event, enabling access to the e-commerce shopping cart, wherein the at least one gesture event comprises at least one sliding gesture, wherein the at least one sliding gesture comprises sliding the e-commerce shopping cart across the touch screen in a sliding path wherein the at least one code section comprises code for:
upon enabling the access, displaying on the touch screen:
a list of one or more items stored in the e-commerce shopping cart, the one or more items available for sale on the web site; and
at least one purchase recommendation for at least another item available for sale on the web site, the at least one purchase recommendation based on the one or more items stored in the e-commerce shopping cart.

10. The non-transitory, machine-readable storage medium according to claim 9, wherein the at least one code section comprises code for:
enabling sharing at least a portion of the e-commerce shopping cart within a social network associated with a user profile.

11. The non-transitory, machine-readable storage medium according to claim 9, wherein the at least one code section comprises code for:
upon enabling the access, displaying on the touch screen a list of one or more stored shopping carts associated with a user profile.

12. A non-transitory, machine-readable storage medium, having stored thereon a computer program having at least one code section for managing an electronic commerce (e-commerce) shopping cart, the at least one code section executable by a machine for causing the machine to perform a method comprising:
in a computing device comprising a touch screen, memory, and at least one processor:
receiving a selection of one of a plurality of web pages associated with an e-commerce web site;
displaying the selected one of the plurality of web pages and an indication of the e-commerce shopping cart on the touch screen, wherein:
the indication of the e-commerce shopping cart slides to a predetermined location on the touch screen,
the e-commerce shopping cart comprises a work space on the e-commerce web site,
the e-commerce shopping cart is categorized according to one or more items within the e-commerce shopping cart,
the e-commerce shopping cart is searchable by a third party, and
the indication of the e-commerce shopping cart is integrated for display into each of the plurality of web pages;
while displaying the selected one of the plurality of web pages and the indication of the e-commerce shopping cart, detecting at least one gesture event associated with the e-commerce shopping cart; and
upon detecting the at least one gesture event, enabling access to the e-commerce shopping cart, wherein the at least one gesture event comprises at least one sliding gesture, wherein the at least one sliding gesture comprises sliding the e-commerce shopping cart across the touch screen in a sliding path wherein the indication of the e-commerce shopping cart comprises an indication of the number of items stored in the e-commerce shopping cart.

13. A non-transitory, machine-readable storage medium, having stored thereon a computer program having at least one code section for managing an electronic commerce (e-commerce) shopping cart, the at least one code section executable by a machine for causing the machine to perform a method comprising:
in a computing device comprising a touch screen, memory, and at least one processor:
receiving a selection of one of a plurality of web pages associated with an e-commerce web site;
displaying the selected one of the plurality of web pages and an indication of the e-commerce shopping cart on the touch screen, wherein:
the indication of the e-commerce shopping cart slides to a predetermined location on the touch screen,
the e-commerce shopping cart comprises a work space on the e-commerce web site,
the e-commerce shopping cart is categorized according to one or more items within the e-commerce shopping cart,
the e-commerce shopping cart is searchable by a third party, and
the indication of the e-commerce shopping cart is integrated for display into each of the plurality of web pages;
while displaying the selected one of the plurality of web pages and the indication of the e-commerce shopping cart, detecting at least one gesture event associated with the e-commerce shopping cart; and
upon detecting the at least one gesture event, enabling access to the e-commerce shopping cart, wherein the at least one gesture event comprises at least one sliding gesture, wherein the at least one sliding gesture comprises sliding the e-commerce shopping cart across the touch screen in a sliding path wherein the e-commerce shopping cart is associated with a user profile of a user of the e-commerce web site.

14. The non-transitory, machine-readable storage medium according to claim 13, wherein the at least one code section comprises code for:
storing the e-commerce shopping cart as a shopping cart associated with the user profile.

15. The non-transitory, machine-readable storage medium according to claim 14, wherein the stored shopping cart is discoverable via an item search on the e-commerce web site.

16. A non-transitory, machine-readable storage medium, having stored thereon a computer program having at least one code section for managing an electronic commerce (e-commerce) shopping cart, the at least one code section executable by a machine for causing the machine to perform a method comprising:
in a computing device comprising a touch screen, memory, and at least one processor:
receiving a selection of one of a plurality of web pages associated with an e-commerce web site;
displaying the selected one of the plurality of web pages and an indication of the e-commerce shopping cart on the touch screen, wherein:
the indication of the e-commerce shopping cart slides to a predetermined location on the touch screen,
the e-commerce shopping cart comprises a work space on the e-commerce web site,
the e-commerce shopping cart is categorized according to one or more items within the e-commerce shopping cart,
the e-commerce shopping cart is searchable by a third party, and
the indication of the e-commerce shopping cart is integrated for display into each of the plurality of web pages;
while displaying the selected one of the plurality of web pages and the indication of the e-commerce shopping cart, detecting at least one gesture event associated with the e-commerce shopping cart; and
upon detecting the at least one gesture event, enabling access to the e-commerce shopping cart, wherein the at least one gesture event comprises at least one sliding gesture, wherein the at least one sliding gesture comprises sliding the e-commerce shopping cart across the touch screen in a sliding path wherein the at least one code section comprises code for:
upon detecting at least another gesture event, preventing access to the e-commerce shopping cart and resuming display of the selected one of the plurality of web pages.

* * * * *